Feb. 25, 1936.   P. J. VAN POELVOORDE   2,031,992
STABLE GYROPLANE AIRCRAFT
Filed May 2, 1934

Inventor:
Peter J. Van Poelvoorde
By A. Yates Dowell
Atty.

Patented Feb. 25, 1936

2,031,992

UNITED STATES PATENT OFFICE 2,031,992

STABLE GYROPLANE AIRCRAFT

Pieter Jacobus van Poelvoorde, The Hague, Netherlands

Application May 2, 1934, Serial No. 723,497
In the Netherlands May 18, 1933

2 Claims. (Cl. 244—19)

My present invention relates generally to the construction of gyroplanes or helicopters, and more particularly to means whereby to supply the existing lack of stability of helicopters and the principal object of my invention is to provide a gyroplane construction including effective stability, so designed as to be able to hover in midair.

It is known that the lack of stability of the present helicopter-construction is due to the circumstances, first:

That the resultant of the lifting-force of the helicopter, as a rule, lays beyond its center of gravity, thus causing a canting- or tilting-moment round about that center, and secondly:

That the helicopter as constructed hitherto consists only in a single stiff entirety, so that no means is present to counteract that canting-moment and therefore in that in such a helicopter there is no balance-working or redressing, present. Consequently, the stiff helicopter, after having risen in the air, may tilt and finally crash.

Due to this lack of stability air-navigation with helicopters until now failed entirely. Such ought to be regretted, as stable aircraft heavier than air, would undoubtedly embody in it many advantages above the navigation with the huge gas-airships and that with the unbalanced aeroplanes.

An object of the invention is the provision of a stable gyroplane construction which will embody two parts, being an upper or lifting part and the lower or balancing or redressing part, which are movably connected one to another, of which the relation is such that a canting or tilting of the upper part will be counteracted by the weight of the lower part.

In the accompanying drawing I have illustrated a construction capable of carrying out my present invention, although I do not wish to be understood as limiting myself to the details illustrated.

Figure 1:
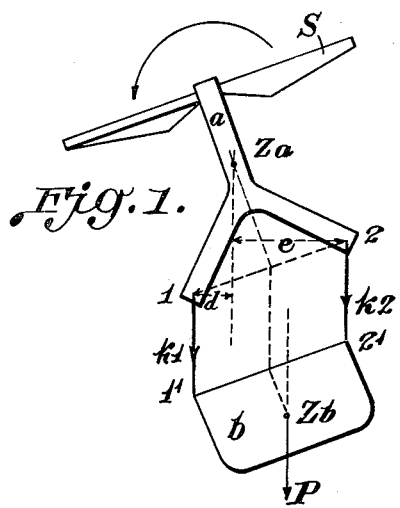
Figure 2:
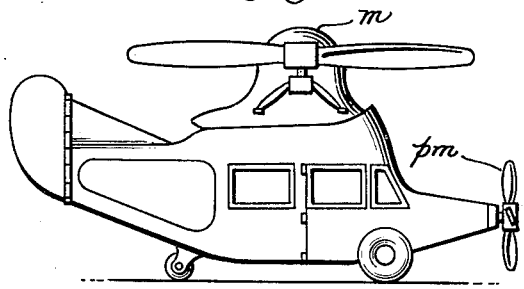
Figure 3:
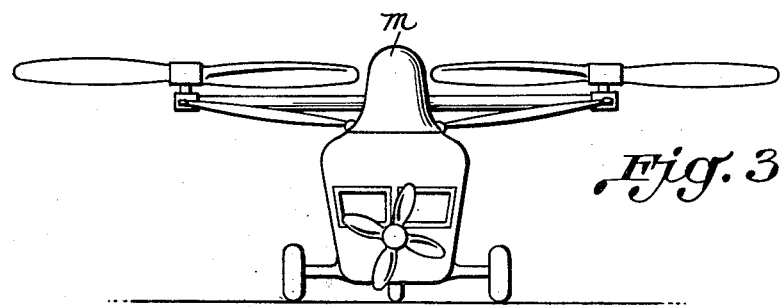
Figure 4:
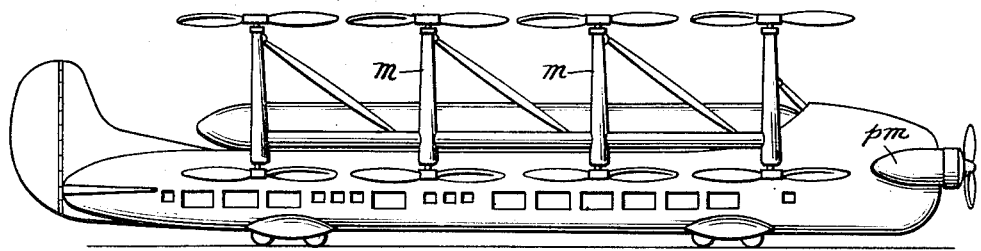

In this drawing Figure 1 shows schematically the balance-working of this invention, whilst in Figure 2 is given an example of a small type of stable gyroplane, Figure 3 shows the front-view thereof, and Figure 4 shows a sketch for a large type of stable gyroplane.

Referring now to Figure 1, $a$ and $b$ represent the two parts, which form each on its own a stiff entirety and are connected one to another by a flexible medium, namely the cords or hangers $k_1$ and $k_2$, which are movable in both directions. To the upper part $a$ belongs the lifting- or supporting-screw S. The lower part $b$ is suspended from the upper part $a$ through the cords or hangers $k$, which also may be composed of stiff bars, provided their ends are movably connected to the parts $a$ and $b$ by universal joints, so as to allow movement of $b$ relative to $a$.

The balance-working of this kind of stable gyroplane is explained as follows:—

The whole system composed of the upper and lower parts and the intermediate flexible medium will be in equilibrium, if the upper part $a$ is in equilibrium. Then, $b$ hangs quietly from $a$. The balance of $a$ at standstill in the air is dominated by the several forces relative to the center of gravity of the upper part $a$. As the weight-resultant of the upper part $a$ goes through $Za$, this force will exercise no moment-working upon $a$. The force exercised by the supporting-screw S, as a rule, does not pass through $Za$, but generally lies beyond this point, so that the resultant-lifting-force will exercise a tilting-moment upon the upper part.

It is supposed, that, due to last-called tilting-moment, the upper part $a$ will cant in the direction of the arrow, which canting may eventually have been reinforced by a gust of wind. The question now rises which influence will the tensile forces $k_1$ and $k_2$, present in the cords of the same names, exert upon the canting of the upper part $a$? These forces are internal tensions in the whole system of $(a+b)$. Considered, however, respective to the upper part alone, as an apart entirety, these forces are external-ones, which affect the equilibrium of the upper part $a$. Respective to the center of gravity $Za$ the tensile forces $k_1$ and $k_2$ will exert respectively the moments of inertia $k_1 \times d$ in the direction of the arrow and $k_2 \times e$ opposite to the direction of the arrow. It is obvious, that the first-mentioned $k_1 d$ will reinforce the cant, whilst on the other hand the moment $k_2 e$ will counteract it. The question now arises: what proportion do these two products $k_1 d$ and $k_2 e$ bear to one another? The answer will be as follows:

Supposing, first, that the center of gravity $Za$ of the upper part $a$ lies above the joints 1 and 2, it will be clear from Figure 1, that $e$ will be larger than $d$.

Supposing, further, that the center of gravity $Zb$ of the lower part $b$ lies below the joints 1' and 2', the figure shows that $Zb$ lies nearer to $k_2$ than to $k_1$. As the weight-resultant P of the lower part goes through $Zb$, it will be clear that P lies nearer to $k_2$ than to $k_1$. Due to this and, as $k_1$ and $k_2$ are the components of P, it will be clear that $k_2$ is larger than $k_1$.

As, resuming, both factors $k_2$ and $e$ of the production $k_2e$ are larger than the similar subsequent factors $k_1$ and $d$ of the production $k_1d$, it is obvious that the first-mentioned production is by far larger than the last-mentioned. Due to this, the resulting moment $k_2e-k_1d$ will have its direction opposite to that of the arrow and therefore counteract the cant of the upper part $a$.

In the normal stand, if $k_1=k_2$ and $d=e$, the resulting moment will be nought, whilst beyond this stand, the resulting counteracting moment grows with the increase of the turning aside of the upper part $a$. Both are typical features of a balance-working or redressing, so that this type of gyroplane is a stable one.

Referring to the Figures 2, 3 and 4, it will be noticed that in both types of gyroplanes the cords or cables $k$ are fitted inside the covering of the gyroplanes, in order to avoid the air-resistance, when flying. So, these cords are not visible from the outside. In both types $m$ are the motors moving the rotating supporting-wings, whilst $pm$ are the motors moving the propellers. If the gyroplanes stand on the ground, the upper parts $a$ lie on the lower parts $b$ through special stands, thus simultaneously clearing of the cables $k$. These stands may be fitted inside the covering and, as their specific construction is immaterial insofar as the invention covered herein is concerned, they are not shown in the Figures 2, 3 and 4. These and the other features referred to in this paragraph are only mentioned, in explanation as to a satisfactory application to a construction of this new type of aircraft.

I am aware that it has previously been proposed to construct a gyroplane consisting of two parts, of which the lower is suspended from the upper, in such a way, that the hanging-structure admits no movement of both parts relative to one another, so that there is no balance-working or redressing in such a system as provided for in my present invention.

Certain arrangements have also been proposed, in which the lower part is suspended from the upper only at a single point of the latter. It is obvious that such a structure will cause an inconvenient and troublesome torsion and swinging of the lower part relative to the upper one, and consequently such a system is unhandy to navigate and has numerous defects referred to hereinbefore.

I claim:—

1. A gyroplane comprising a rigid supporting structure, including a rotatable lifting means on the structure, and a fuselage suspended below said supporting structure by a plurality of laterally spaced forward and rearward connecting members of equal length and in parallel relationship with each other between the lower part of said supporting structure and the upper part of said fuselage above its center of gravity arranged to permit movement of the supporting structure and fuselage with respect to each other whereby the tilting movements of the rotatable lifting means supporting structure and fuselage are balanced against each other, the canting or tilting of the supporting structure being counteracted by the weight of the fuselage.

2. A gyroplane comprising a rigid supporting structure, including a rotatable lifting means on the structure, and a body part suspended below said supporting structure by a plurality of laterally spaced forward and rearward connecting members of equal length and in parallel relationship with each other between said supporting structure below the center of gravity thereof and the upper part of said body part above its center of gravity arranged to permit movement of the supporting structure and body part with respect to each other whereby the movement of the center of gravity of the body part is reduced and thereby gives a greater restoring action.

PIETER JACOBUS van POELVOORDE.